(12) United States Patent
Crawford et al.

(10) Patent No.: US 8,310,237 B2
(45) Date of Patent: Nov. 13, 2012

(54) APPARATUS FOR AND METHOD OF DETECTING A CONDUCTIVE OBJECT

(75) Inventors: Thomas M. Crawford, Edinburgh (GB); David Mackenzie, East Linton (GB)

(73) Assignee: Sense Marine Limited (GB)

( * ) Notice: Subject to any disclaimer, the term of this patent is extended or adjusted under 35 U.S.C. 154(b) by 708 days.

(21) Appl. No.: 12/439,751

(22) PCT Filed: Aug. 31, 2007

(86) PCT No.: PCT/GB2007/003294
§ 371 (c)(1),
(2), (4) Date: Oct. 6, 2009

(87) PCT Pub. No.: WO2008/029093
PCT Pub. Date: Mar. 13, 2008

(65) Prior Publication Data
US 2010/0164499 A1    Jul. 1, 2010

(30) Foreign Application Priority Data

| Sep. 4, 2006 | (GB) | 0617286.0 |
| Dec. 14, 2006 | (GB) | 0624913.0 |
| Jun. 6, 2007 | (GB) | 0710800.4 |

(51) Int. Cl.
*G01V 3/08* (2006.01)

(52) U.S. Cl. ........................... 324/329; 324/559

(58) Field of Classification Search ............... 324/329, 324/559
See application file for complete search history.

(56) References Cited

U.S. PATENT DOCUMENTS

| 3,052,837 A | | 12/1958 | Arbogast et al. |
| 3,315,155 A | | 4/1967 | Colani |
| 3,676,772 A | * | 7/1972 | Lee .............................. 324/233 |
| 4,110,679 A | | 8/1978 | Payne ............................. 324/3 |
| 4,982,163 A | * | 1/1991 | Viikari et al. ................. 324/559 |
| 5,461,313 A | * | 10/1995 | Bohon et al. .................. 324/240 |
| 5,969,528 A | | 10/1999 | Weaver ......................... 324/329 |

FOREIGN PATENT DOCUMENTS

| EP | 1 298 457 | 4/2003 |
| GB | 2 394 298 | 4/2004 |

* cited by examiner

*Primary Examiner* — Arleen M Vazquez
(74) *Attorney, Agent, or Firm* — DLA Piper LLP (US)

(57) ABSTRACT

The invention relates to an apparatus for detecting a conductive object (5). The apparatus comprises at least one transmitting device (2), which is operative to generate a first changing magnetic flux (11, 12), and at least one receiving device (10), which is operative, in use, to receive a second changing magnetic flux (9) generated by the conductive object (5) in dependence upon the first changing magnetic flux. In addition, the at least one transmitting device and the at least one receiving device are disposed in relation to each other so as to attenuate the first changing magnetic flux (11, 12) received directly by the at least one receiving device (10) from the at least one transmitting device (2).

19 Claims, 8 Drawing Sheets

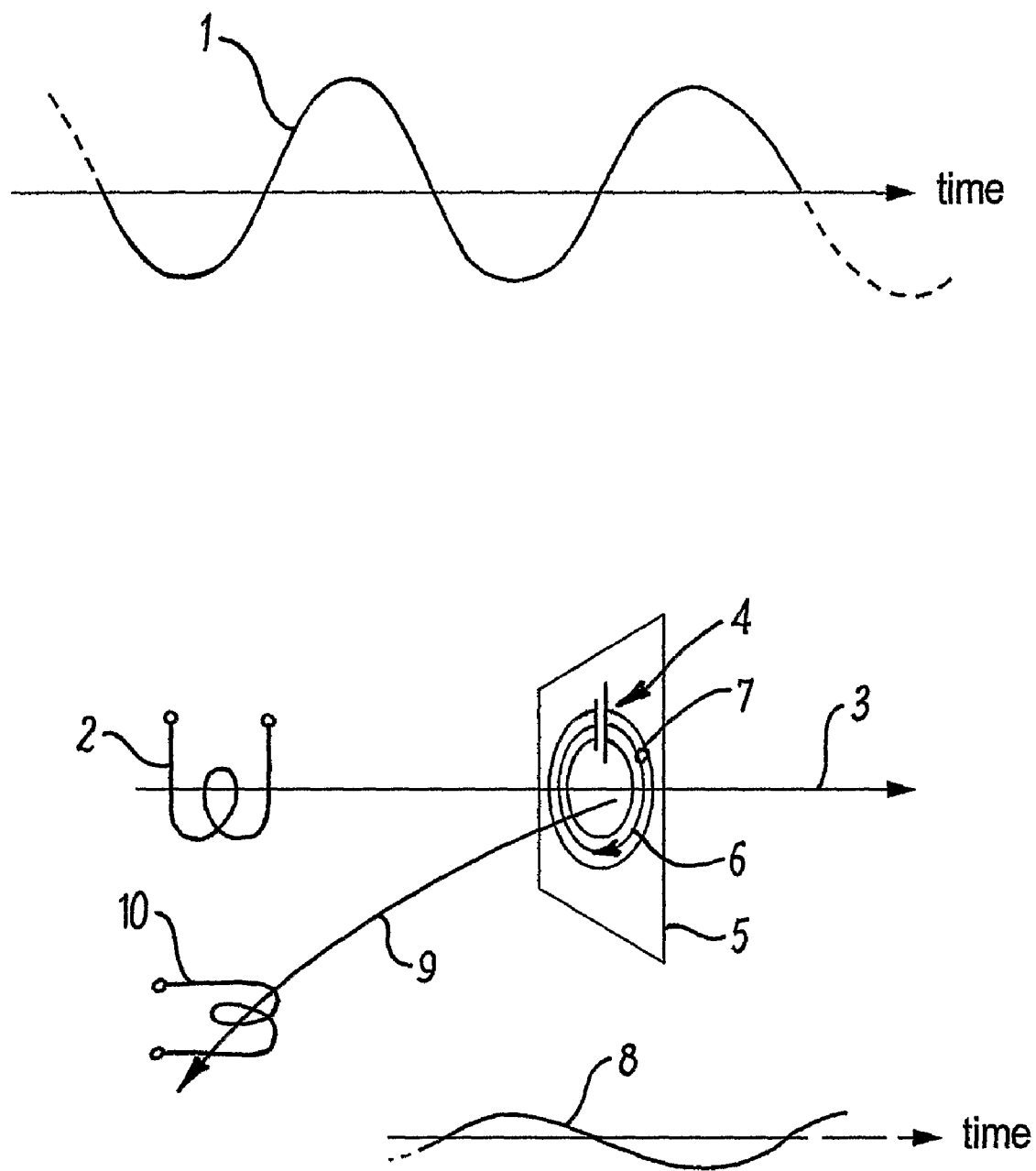
_Fig. 1_

APPARATUS FOR AND METHOD OF DETECTING A CONDUCTIVE OBJECT

FIELD OF THE INVENTION

The present invention relates to an apparatus for and method of detecting a conductive object.

BACKGROUND TO THE INVENTION

Pipelines are often buried to reduce the likelihood of accidental contact with ships' anchors or fish trawling apparatus. Further risks arise for oil or gas pipelines in areas, such as the southern North Sea, where the water is shallow and tidal currents can scour silt from beneath pipelines leaving them unsupported. Unsupported pipelines are liable to fracture and thereby cause significant environmental damage. When a pipeline has been installed, a contracted depth of burial normally has to be demonstrated to have been achieved. In addition, it is necessary to survey the entire length of an installed pipeline periodically to determine whether or not the pipeline remains buried. Determining if the buried depth of a pipeline has changed or if a pipeline has been displaced laterally may also be helpful.

A sub-sea survey of an installed pipeline normally provides the key parameters of a record of the pipeline track and Depth of Burial (DOB) of the pipeline together with a video of the seabed. Sub-sea surveys are often carried out by a Remotely Operated Vehicle (ROV) carrying pipe tracking and DOB measurement apparatus.

Known approaches to pipe measurement include the magnetometer, which measures local changes in the earth's magnetic flux caused by a target pipe, and passive systems, in which an electrical tone is applied to a pipe to be tracked and the applied electrical tone is detected by a sensing device. Pulse induction apparatus provides a third known approach to pipe detection in which a pulse of changing magnetic flux emitted by a transmitting device is used to induce a changing eddy current in a conductive target pipe. The induced eddy current in turn induces a changing magnetic flux that is detected by a receiving device. The transmitting device and the receiving device normally comprise at least one flat coil of wire.

A limitation of known pulse induction apparatus arises from the inverse cube law of induced fields. The field produced by a flat current loop falls by a denominator term comprising $[a^2+b^2]^{3/2}$, where 'a' is the diameter of the coil and 'b' is the distance along the axis from the plane of the coil. The numerator term also comprises $a^2$. Thus, as 'b' increases the field falls by $1/b^3$. As the target eddy current functions as a second flat current loop, the attenuation from transmitting device to target pipe to receiving device increases as the sixth power of distance. This means that a signal voltage is divided by sixty-four for each doubling of distance. Therefore, transmitted pulses are significantly greater than received pulses in known pulse induction apparatus. Typically, the transmit pulse can be as much as $10^6$ greater than the received pulse in a practical pulse induction apparatus.

The difference in magnitude between a transmitted pulse and a received pulse gives rise to another problem. More specifically, most of the high rate of change eddy current in the target pipe overlaps in time with the transmitted pulse. Thus, direct inductive and capacitive coupling between the transmitting device and the receiving device normally overloads the receiving device. A known approach to this problem is to turn the receiving device off when the transmitting device is operative to transmit a pulse. In addition, the length of time that the receiving device is turned off is extended by a predetermined amount to take account of transient response limitations of electronic circuitry of the receiving apparatus. U.S. Pat. No. 3,315,155 (to Claus Colani) describes such a pulse induction apparatus, in which the receiving device makes use of only the decaying tail of a pulse received from a target pipeline.

It is an object for the present invention to provide an improved apparatus that is operative on the basis of the above described eddy current induction approach.

STATEMENT OF INVENTION

The present inventor has appreciated that known pulse induction measuring apparatus have shortcomings and the present invention has been devised in the light of this appreciation.

According to a first aspect of the present invention there is provided an apparatus for detecting a conductive object, the apparatus comprising:
 at least one transmitting device operative to generate a first changing magnetic flux; and
 at least one receiving device operative, in use, to receive a second changing magnetic flux generated by the conductive object in dependence upon the first changing magnetic flux,
 the at least one transmitting device and the at least one receiving device being disposed in relation to each other so as to attenuate the first changing magnetic flux received directly by the at least one receiving device from the at least one transmitting device.

In use, the attenuation of the first changing magnetic flux received directly by the at least one receiving device (i.e. not by way of the conductive object) provides a more favourable ratio of second changing magnetic flux received by the receiving device to first changing magnetic flux received directly by the receiving device compared with known apparatus. This provides performance advantages for the apparatus, for example, as regards sensitivity of detection, power consumption, etc.

More specifically, the receiving device may be operative to receive substantially all of the second changing magnetic flux whilst the at least one transmitting device is generating the first changing magnetic flux. This is because the attenuation of the first changing magnetic flux received directly by the at least one receiving device may provide for a reduction in an extent to which the second changing magnetic flux is masked by the directly received first changing magnetic flux. Hence the present invention can make use of substantially all of the second changing magnetic flux compared with the apparatus of U.S. Pat. No. 3,315,155, which uses only the decaying tail of a pulse received from a target conductive object. Thus, the present invention provides for improved sensitivity of detection of conductive objects.

Alternatively or in addition, the at least one transmitting device may be operative to generate at least one of: a pulse of magnetic flux; and a continuously changing magnetic flux, such as of sinusoidal form.

More specifically, the at least one transmitting device may be operative to generate a continuously changing magnetic flux. This is because there may be no need to turn off the receiving device so that it receives only part of the second changing magnetic flux. The use of a continuously varying magnetic flux may reduce undesired signals in the receiving device caused by direct capacitive coupling between the receiving device and the transmitting device. Pulsed magnetic flux can give rise to undesirable high frequency signal components.

More specifically, the apparatus may be configured such that an amplitude characteristic and a time period of the continuously changing magnetic flux may be changed.

Changing the amplitude characteristic and the time period can provide for generation of a second changing magnetic flux by a given conductive object of sufficient amplitude for reception by the receiving device.

Alternatively or in addition, the apparatus may be configured such that a plurality of changing magnetic fluxes are generated in the at least one receiving device in dependence on direct reception of the first changing magnetic flux from the transmitting device, an aggregate effect of the plurality of magnetic fluxes being less than a sum of the absolute values of the plurality of magnetic fluxes. The aggregation effect may be in dependence on the changing magnetic fluxes being of different directions. Thus, the electromotive forces (emfs) generated in the at least one receiving device may reduce one another.

More specifically, the apparatus may be configured such that the plurality of magnetic fluxes substantially cancel each other. Thus, the electromotive forces (emfs) generated in the at least one receiving device may cancel one another.

Alternatively or in addition, the apparatus may be configured such that changing magnetic fluxes are generated in respective different parts of a receiving device.

Alternatively or in addition, the apparatus may comprise a plurality of receiving devices, the apparatus being configured such that a changing magnetic flux is generated in each receiving device.

More specifically, the receiving devices may be electrically connected to each other, e.g. in series, such that the magnetic fluxes are in different directions to each other. Thus, respective emfs in the receiving devices may substantially cancel each other.

Alternatively or in addition, the at least one transmitting device may lie in a first plane and the at least one receiving device may lie in a second plane, the first plane and second plane intersecting each other.

More specifically, the first and second planes may be substantially orthogonal to each other.

Alternatively or in addition, the apparatus may comprise a transmitting device and two receiving devices, the two receiving devices being spaced apart from each other and substantially parallel to each other.

More specifically, the transmitting device may be disposed in a space between the two receiving devices. The two receiving devices may be electrically coupled to each other in series.

Alternatively or in addition, a first plane in which the transmitting device lies may intersect at least one second plane in which the receiving devices lie.

More specifically, the first plane may intersect the at least one second plane at an oblique angle.

Alternatively or in addition, the transmitting device may define a first substantially rectangular footprint and the receiving device may define a second substantially rectangular footprint.

Alternatively or in addition, the transmitting device may intersect the receiving device.

More specifically, the transmitting device may be orthogonal to the receiving device.

Alternatively or in addition, a part of the transmitting device on a first side of the receiving device may be substantially a same size as another part of the transmitting device on a second, opposing side of the receiving device.

Alternatively or in addition, a part of the receiving device on a first side of the transmitting device may be substantially a same size as another part of the receiving device on a second, opposing side of the transmitting device.

The present inventor has appreciated that the feature of disposing the at least one transmitting device and the at least one receiving device in relation to each other so as to attenuate the first changing magnetic flux received directly by the at least one receiving device is of benefit when the apparatus is used in a conductive medium, such as seawater.

The presence of ions in a conductive medium, such as seawater, may provide for the formation of eddy currents in the conductive medium in response to the first changing magnetic flux generated by the transmitting device. Such eddy currents may give rise to changing magnetic fluxes that are received by the receiving device and mask the second changing magnetic field received from the conductive object being detected. This problem is known and has been addressed by increasing the amount of time that the receiving device is turned off while the transmitting device is generating the first changing magnetic flux. This known approach takes advantage of the time constant of seawater, which is normally faster than the time constant of the conductive object being detected. However, increasing the turn off time of the receiving device reduces the sensitivity of the apparatus.

Another known approach to eddy currents in the conductive medium is to measure the response of the conductive medium in the absence of the conductive object. The measured response is stored and subtracted from responses measured when in use with a conductive target to arrive at a true conductive object measurement. However, changes in the conductivity of the conductive medium reduce the effectiveness of this approach.

The present invention addresses the problem of eddy currents in the conductive medium by attenuating changing magnetic flux received by the at least one receiving device from eddy currents in the conductive medium. This is because the conductive medium functions as a homogeneous conductive object and because the apparatus of the present invention operates in the same fashion for magnetic flux received from eddy currents in the conductive medium as for magnetic flux received directly by the receiving device from the transmitting device.

Alternatively or in addition, the apparatus may be configured such that a first integral of magnetic flux density over a predetermined area on a first side of one of the receiving and transmitting devices is substantially the same as a second integral of magnetic flux density over a predetermined area on a second, opposing side of the one of the receiving and transmitting devices.

Alternatively or in addition, where the transmitting device lies in a first plane and the receiving device lies in a second plane, the transmitting device and the receiving device may be disposed in relation to each other such that there is symmetry about one of the first and second planes.

More specifically, the transmitting device and the receiving device may be disposed in relation to each other such that there is symmetry about the first and the second planes.

Alternatively or in addition, the apparatus may comprise two receiving devices spaced apart from each other. The two receiving devices may lie in respective, substantially parallel planes.

More specifically, the apparatus may be configured such that, in use, the two receiving devices are at different distances from a conductive object being detected.

In use, each of the two receiving devices provides a respective detection signal in dependence on a received second changing magnetic flux received from the conductive object. The apparatus is operative to determine a distance from the apparatus to a detected conductive object in dependence upon the respective detection signals. Depth of Burial (DOB) may be determined on the basis of a thus determined distance by means of well know techniques, e.g. involving the use of sonar to determine the location of the seabed in relation to the apparatus. The distance may be determined without knowing the size of the conductive object being detected and such that the effect of the magnitude of the magnetic flux received by the receiving device is reduced. In contrast, determination of distance in known apparatus is on the basis of the magnitude of the received magnetic flux. This means that the size of the target must be known.

Alternatively or in addition, the apparatus may further comprise an electrical connection between the transmitting device and the receiving device, the apparatus being configured such that the electrical connection is operative to change magnetic flux coupled directly from the transmitting device to the receiving device.

In use, the electrical connection can be used to address magnetic coupling between the transmitting device and the receiving device arising from, for example, inaccuracies in manufacture of the apparatus. The electrical connection may be used to address such magnetic coupling by reducing or increasing the coupled magnetic flux.

More specifically, the apparatus may be configured to change at least one of an amplitude and a phase of an electrical signal conveyed by the electrical connection.

Alternatively or in addition, an electrical signal conveyed on the electrical connection may correspond to a signal driving the transmitting device. This embodiment may be particularly useful where the transmitting device generates a continuously changing magnetic flux.

More specifically, the electrical signal may be substantially the same as the signal driving the transmitting device.

Alternatively or in addition, the receiving device may comprise a magnetic flux generating component that is operative to generate a magnetic flux in dependence on an electrical signal conveyed by the electrical connection. This embodiment may be particularly useful when the transmitting device generates a pulsed magnetic flux.

More specifically, where the receiving device comprises an electrical coil, the magnetic flux generating component may comprise at least one winding on the electrical coil. For example, the magnetic flux generating component may comprise at least one centre-tapped winding proximate windings of the electrical coil.

Alternatively or in addition, the transmitting device may comprise a magnetic flux receiving component that is operative to provide an electrical signal for conveyance by the electrical connector. This embodiment may be particularly useful when the transmitting device generates a pulsed magnetic flux.

More specifically, where the transmitting device comprises an electrical coil, the magnetic flux receiving component may comprise at least one winding on the electrical coil. For example, the magnetic flux receiving component may comprise at least one centre-tapped winding proximate windings of the electrical coil.

Where the apparatus comprises at least one of a magnetic flux transmitting component and a magnetic flux receiving component, the apparatus may further comprise a transformer operative to drive the transmitting device. This embodiment may be particularly useful where the transmitting device generates a continuously changing magnetic flux.

More specifically, the transformer may comprise a winding, e.g. a centre-tapped winding, which is operative to provide an electrical signal conveyed by the electrical connection.

During tracking of a conductive object, such as a pipeline, over a prolonged period, the stability of the apparatus may deteriorate such that direct coupling is established between the transmitting device and the receiving device. Such deterioration in stability is termed drift. According to known approaches, this problem is addressed by steering the apparatus away from the conductive object, adjusting the apparatus such that the coupling is eliminated and then returning to tracking of the conductive object. However, such known approaches are disruptive to the tracking process and thus undesirable.

Therefore, the apparatus may be configured such that the transmitting device and the receiving device are moved together in relation to the conductive object during use of the apparatus.

More specifically, the apparatus may be configured such that the receiving device provides an output signal comprising at least one first frequency component corresponding to a rate of movement of the transmitting device and the receiving device in relation to the conductive object.

More specifically, the apparatus may be configured such that the output signal provided by the receiving device comprises at least one second frequency component corresponding to drift of the apparatus.

More specifically, the at least one first frequency component may be of a higher frequency than the at least one second frequency component.

Alternatively or in addition, the apparatus may be configured to separate the at least one first frequency component and the at least one second frequency component from each other.

More specifically, the apparatus may be configured to electrically convey the at least one second frequency component to the receiving device such that the effect of the drift is reduced.

Thus, drift at a rate below the rate of movement of the transmitting device and the receiving device in relation to the conductive object may be addressed.

Alternatively or in addition, the transmitting device and the receiving device may be rotated in relation to the conductive object.

Alternatively or in addition, the transmitting device and the receiving device may be mounted for rotation on the apparatus.

Alternatively or in addition, at least one of the transmitting device and the receiving device may comprise an electrical coil.

According to a second aspect of the present invention there is provided a method of detecting a conductive object, the method comprising:

generating a first changing magnetic flux by means of at least one transmitting device; and receiving in at least one receiving device a second changing magnetic flux generated by the conductive object in dependence upon the first changing magnetic flux, the at least one transmitting device and the at least one receiving device being disposed in relation to each other so as to attenuate the first changing magnetic flux received directly by the at least one receiving device from the at least one transmitting device.

More specifically, the method may comprise emitting the first changing magnetic flux through a conductive medium, such as seawater, to the conductive object, the conductive object emitting the second changing magnetic flux to the receiving device through the conductive medium.

More specifically, a conductivity of the medium between the transmitting device and the receiving device may be substantially uniform.

Further embodiments of the second aspect of the present invention may comprise one or more features of the first aspect of the present invention.

According to a third aspect of the present invention, there is provided a sub-sea conveyance, such as a Remotely Operated Vehicle (ROV) or an autonomous sub-sea vehicle, comprising an apparatus according to the first aspect of the present invention.

Embodiments of the third aspect of the present invention may comprise one or more features of the first aspect of the present invention.

The present inventor has appreciated the feature of the first and the second receiving devices being spaced apart from each other as being of wider application than hitherto described. Thus, according to a fourth aspect of the present invention there is provided apparatus for determining a distance of a conductive object, the apparatus comprising:
- at least one transmitting device operative to generate a first changing magnetic flux; and
- at least a first and a second receiving device each operative, in use, to receive a second changing magnetic flux generated by the conductive object in dependence upon the first changing magnetic flux,
- the first and the second receiving devices being spaced apart from each other, such that, in use, the two receiving devices are at different distances from a conductive object being detected.

More specifically, the at least one transmitting device and the at least one receiving device may be disposed in relation to each other so as to attenuate the first changing magnetic flux received directly by at least one receiving device from the at least one transmitting device.

Further embodiments of the fourth aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which:

FIG. 1 illustrates the principle of detection of conductive objects by means of eddy current induction;

SPECIFIC DESCRIPTION

Figure 2:
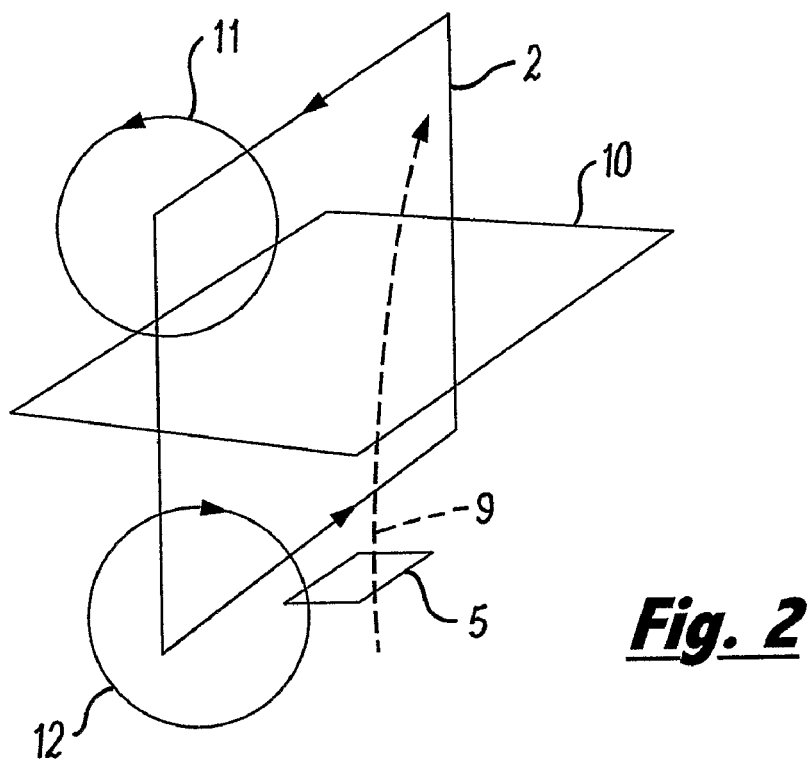
FIG. 2 shows an embodiment of the present invention.

FIG. 1 illustrates the principle of continuous eddy current induction. A sinusoidal waveform is used for illustration. Other continuous waveforms could be employed. A sinusoidal electrical current 1 is applied to a transmit coil 2 which produces a sinusoidal magnetic flux 3. This changing flux induces an electromotive force (emf) 4 in a metal target 5 (Faraday's law). The emf is in a direction such as to circulate a current which acts to oppose the applied field (Lenz's law). The induced sinusoidal eddy current 6 flows around an equivalent metallic path 7 which has inductance L and resistance R. This produces an equivalent L/R time-constant for the target which corresponds to a low pass filter in the frequency domain.

The eddy current waveform 8 in the target produces a changing magnetic flux 9 which induces an emf in a receiving coil 10. This emf signal becomes the input to the receiver used to detect the target pipe. In this embodiment coil 10 and coil 2 are placed relative to each other such that minimal direct magnetic flux couples from the transmit coil 2 into the receive coil 10.

FIG. 2 shows a simple form of cancelling transducer. In this case both coils 2 and 10 are rectangular and intersect along their centre-lines. A changing current in a transmit coil 2 produces changing magnetic fluxes 11 and 12 which circulate in opposing directions around the upper and lower limbs of the coil. If the receive coil 10 is at right angles to the transmit coil 2 then by symmetry no net flux cuts through the plane of the receive coil and so no emf is induced in the receive coil by direct transmit flux. The continuous waveform of the indirect flux 9 produced by the target eddy current is available for detection in the receive coil 10.

Figure 3:
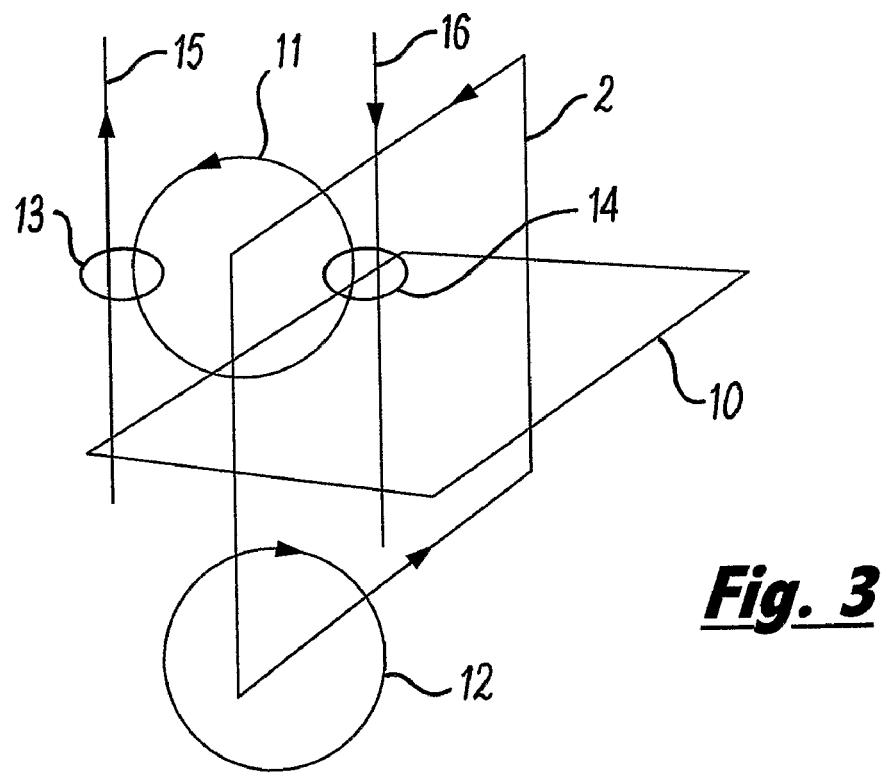
FIG. 3 illustrates the cancellation of the seawater response using the embodiment of FIG. 2.

FIG. 3 shows how the transducer of FIG. 2 directly cancels the eddy current response of seawater. Component 13 shows an electrical eddy current circulating in the seawater around the inducing magnetic flux loop 11. This eddy current lies in a plane whose normal tangential to 11. Component 14 represents an equivalent eddy current in a mirror symmetrical position relative to the plane of the transmit coil 2. As eddy currents 13 and 14 flow in counter-rotating directions they produce magnetic flux 15 and 16 of opposite polarities. Opposing emfs are generated in the receive coil 10 by the components of these fluxes normal to the plane of the 10. These emfs cancel to zero. Any region of sweater will be equivalently balanced by a mirror symmetric region about the plane of the transmit coil 2. An equivalent effect occurs for the magnetic flux loop 12. Analogous symmetrical cancellation occurs for the two limbs of transmit coil 2 which are at right angles to the plane of 10. Therefore the entire seawater response is cancelled in the receive coil 10.

Figure 4:
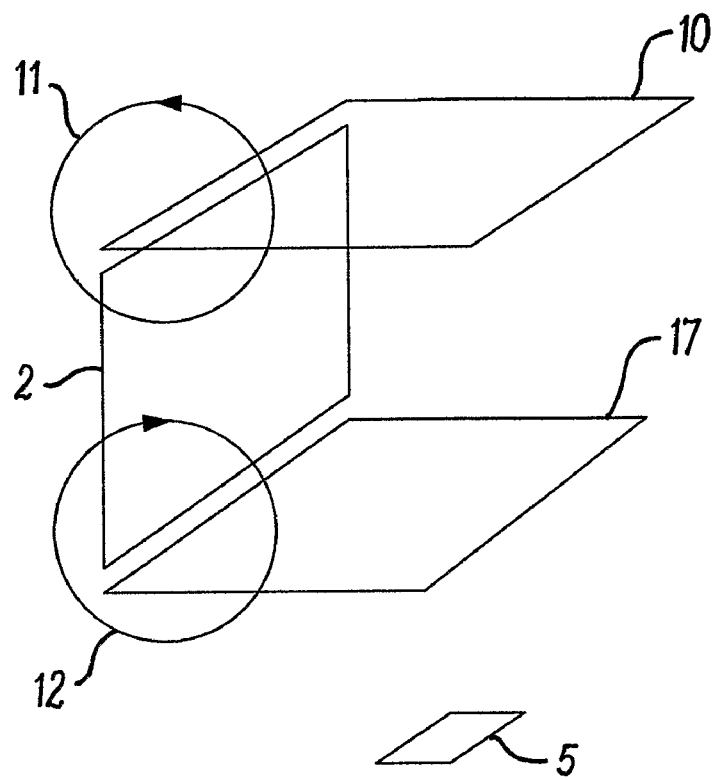
FIG. 4 shows a second embodiment, of the present invention.

FIG. 4 shows how cancellation is obtained using one transmit 2 and two receive coils, 10 and 17. Magnetic flux 12 and magnetic flux 11 generate direct emfs in the two receive coils 10 and 17 which are summed in series to cancel. The receive coil nearest a target 5 will have a larger indirect emf induced by the target eddy current leaving a net emf after cancellation.

Figure 5:
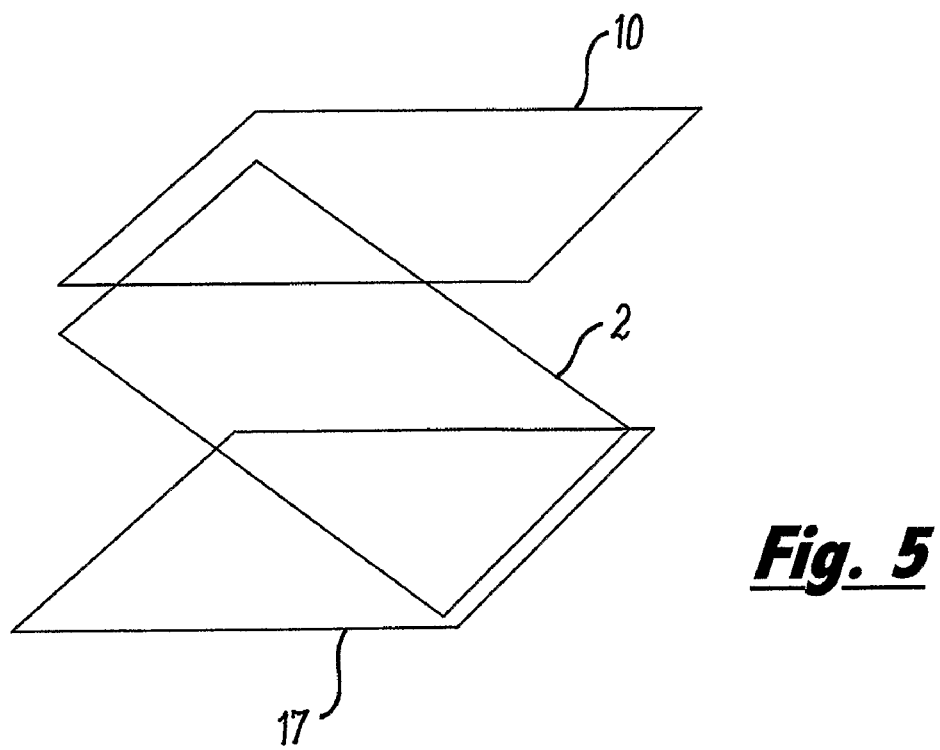
FIG. 5 shows a third embodiment of the present invention.

FIG. 5 shows two receive coils 10 and 17 which when in series still cancel the direct flux from a transmit coil 2 set at an angle relative to the receive coils that is not a right angle.

Figure 6:
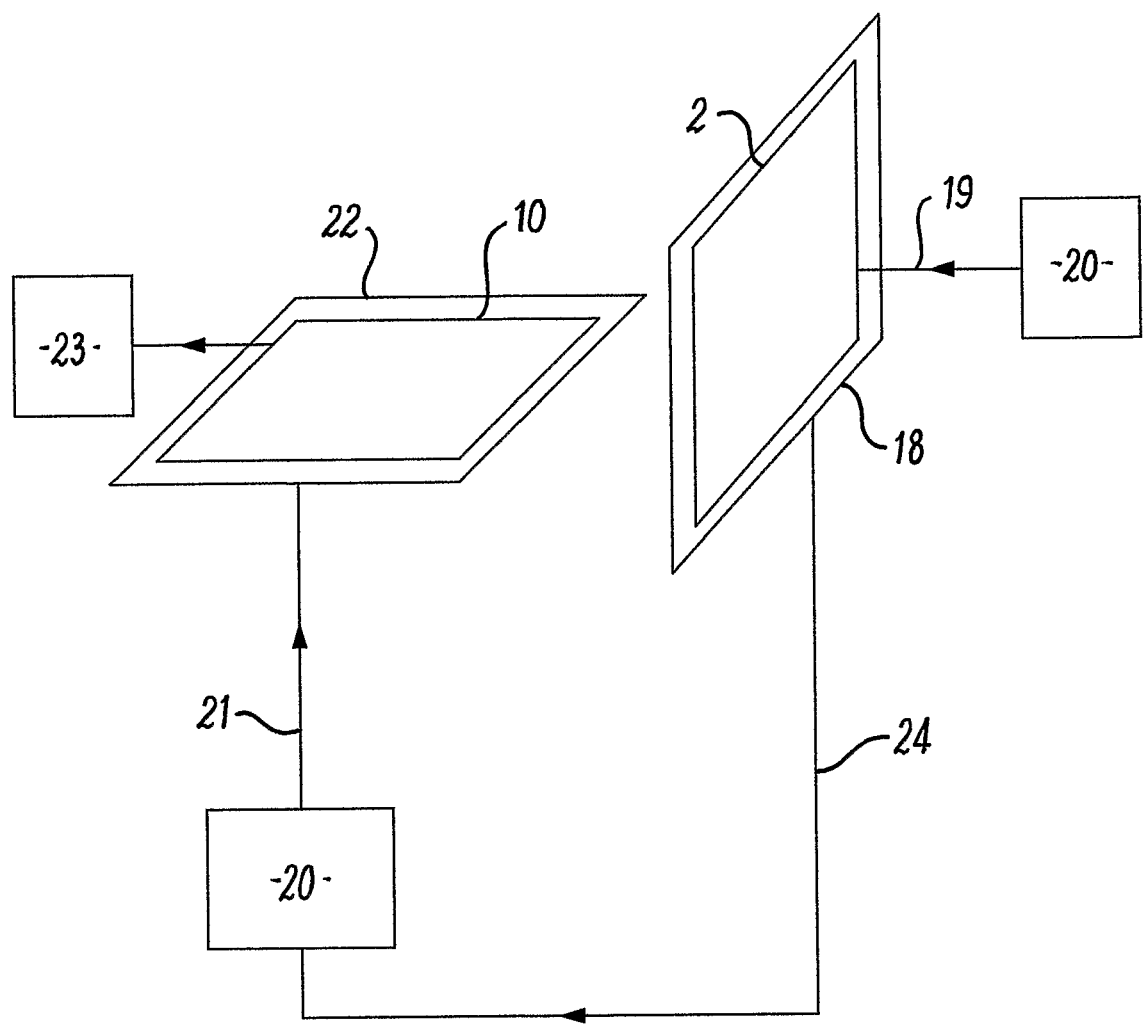
FIG. 6 shows a first arrangement for cancelling mechanical inaccuracies in the present invention.

FIG. 6 shows an electrical method of adjustment to cancel mechanical inaccuracies and ensure direct transmit to receive cancellation. A winding 18 of one or more turns is wound alongside transmit winding 2 which is energised by the transmit signal 19 delivered from the transmitter 20. Winding 18 provides signal 24, a stepped-down transformer-coupled sample of the transmit signal 19. Signal 24 can be changed in amplitude and/or phase by item 20, using methods familiar to the skilled person in the field of signal processing, to introduce modified version 21. Winding 22 of one or more turns is wound alongside receive coil 10 which feeds receiver 23. Winding 22 transformer couples signal 21 into receive coil 10. Adjustments of amplitude and/or phase are made in 20 such as to cancel any direct coupling between 2 and 10 as measured in receiver 23.

Figure 7:
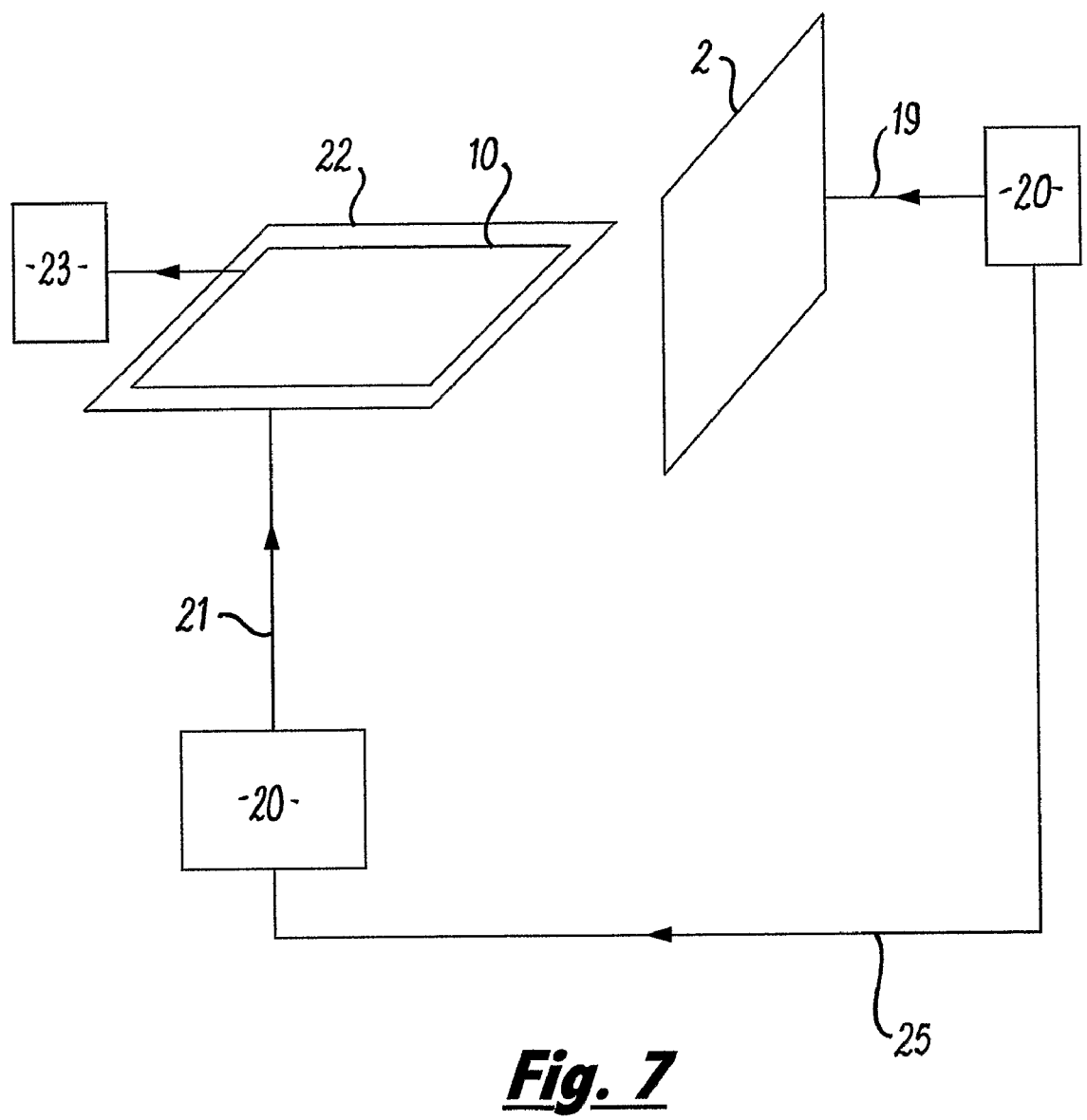
FIG. 7 shows a second arrangement for cancelling mechanical inaccuracies in the present invention.

FIG. 7 shows an alternative electrical method of adjustment to cancel mechanical inaccuracies and ensure direct transmit to receive cancellation. Transmit winding 2 is energized by the transmit signal 19 delivered from the transmitter 20. Signal 25 is a copy of 19. Signal 25 can be changed in amplitude and/or phase by item 20, using methods familiar to one of ordinary skill in the field of signal processing, to produce modified version 21.

Winding 22 of one or more turns is wound alongside receive coil 10 which feeds receiver 23. Winding 22 couples signal 21 into receive coil 10. Adjustments of amplitude and/or phase are made in 20 such as to cancel any direct coupling between 2 and 10 as measured in receiver 23.

Figure 8:
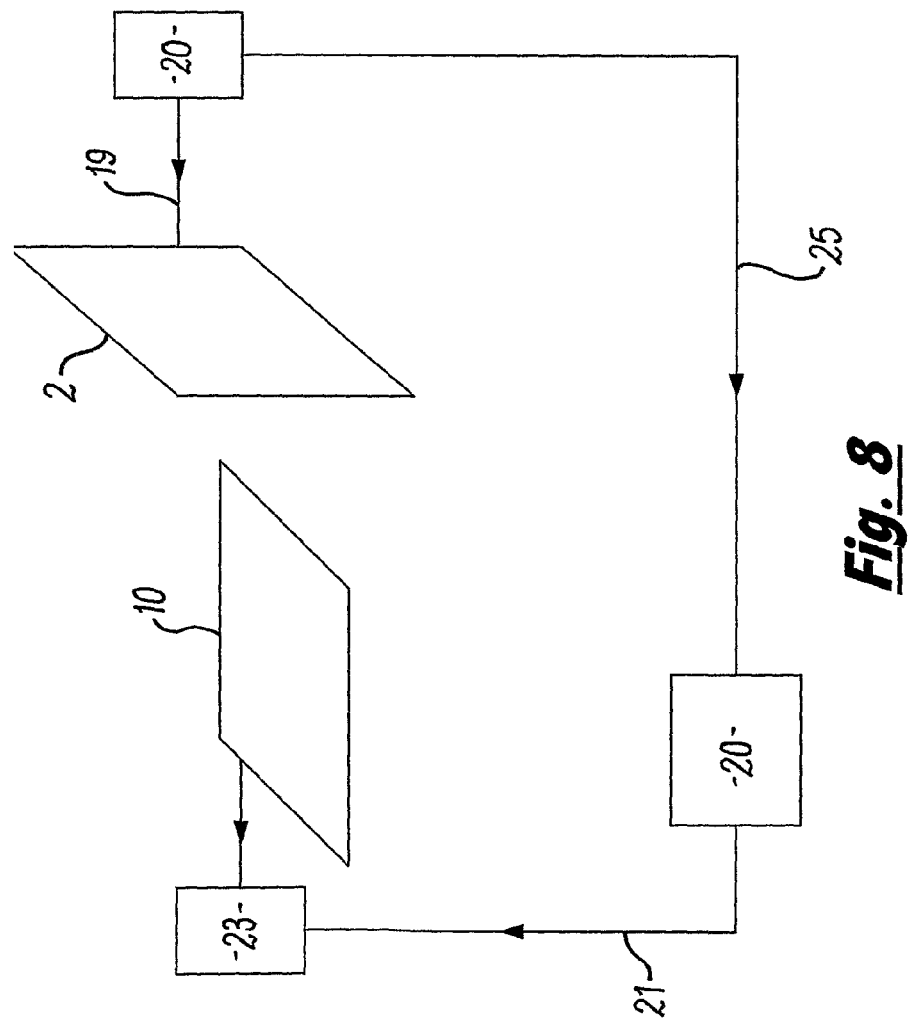
FIG. 8 shows a third arrangement for cancelling mechanical inaccuracies in the present invention.

FIG. 8 shows an alternative electrical method of adjustment to cancel mechanical inaccuracies and ensure direct transmit to receive cancellation. Transmit winding 2 is energized by the transmit signal 19 delivered from transmitter 20. Signal 25 is a copy of signal 19. Signal 25 can be changed in amplitude and/or phase by item 20, using methods familiar to one expert in the field of signal processing, to produce modified version 21. Signal 21 is summed with the signal from receive coil 10 into receiver 23. Adjustments of amplitude and/or phase are made by 20 such as to cancel any direct coupling between 2 and 10 as measured in receiver 23.

Figure 9:
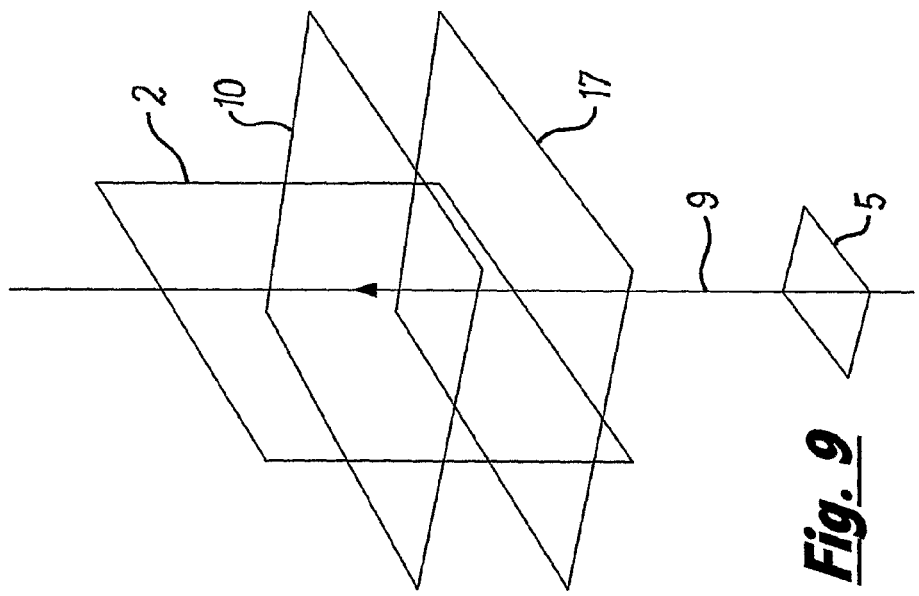
FIG. 9 shows an arrangement for determining a distance of a conductive object.

FIG. 9 shows a version of the cancelling transducer for distance to target estimation. It has one transmit coil 2 and two receive coils 10 and 17. Flux 9 produced by the induced eddy current in target 5 passes through both receive coils. This flux decreases with distance to the target (trending towards a reciprocal sixth power law with increasing distance). Since the transmit coil is at a common distance, the emfs induced in the two receive coils differ only by a reciprocal third power law. The relative size of the emfs induced in the two receive coils is used to estimate distance between the transducer and the target.

Figure 10A:
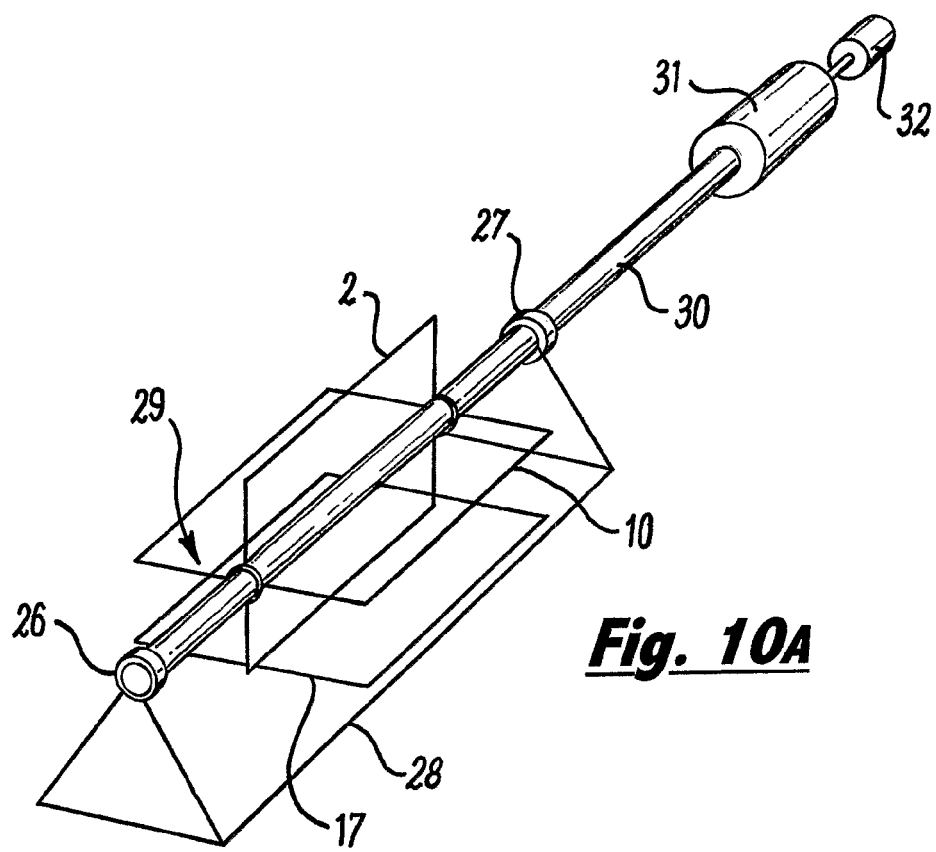
FIG. 10A shows a first arrangement in which the transmitting and receiving devices rotate in relation to a conductive object.

FIG. 10A shows a method of rocking the transducer of FIG. 9. Two bearings 26 and 27 are supported by a frame 28. The transducer 29 comprising coils 2, 10 and 17, is carried in bearings 26 and 27 by means of a torque tube 30. A motor 31 drives the torque tube to change the pointing angle of the transducer. The pointing angle may be changed continuously or in a series of steps. The pointing angle is measured by a shaft encoder 32.

Figure 10B:
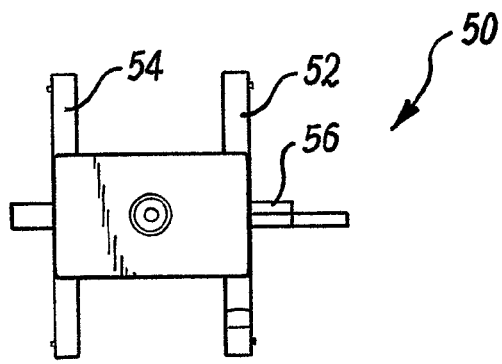
FIGS. 10B and 10C provide end and side views of part of a second arrangement in which the transmitting and receiving devices rotate in relation to a conductive object.
Figure 10C:
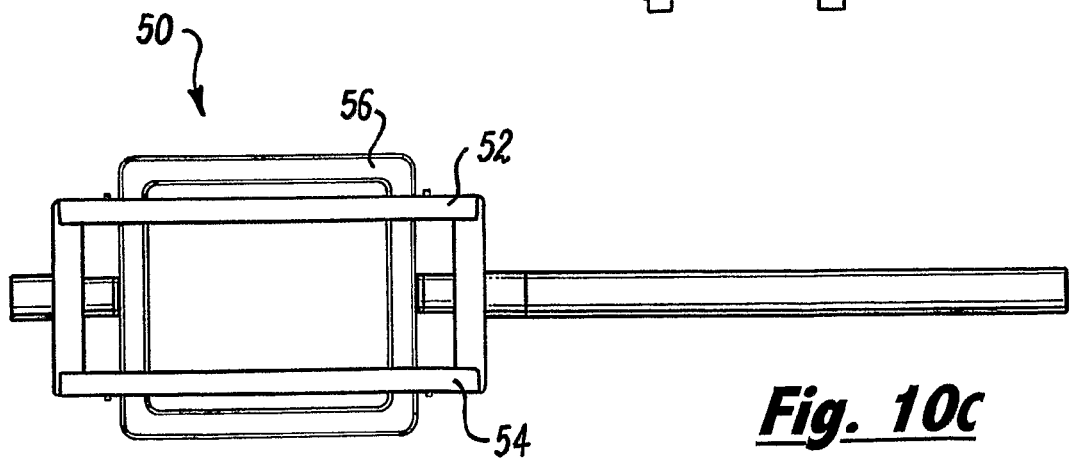

FIGS. 10B and 10C respectively show end and side views of an alternative form of transducer 50 to that shown in FIG. 10A. The transducer 50 of FIGS. 10B and 10C comprises two spaced apart receive coils 52, 54 as described above with reference to FIG. 9 and a transmit coil 56. The receive coils lie in parallel planes and are spaced apart from each other. The transmit coil is disposed in relation to the receive coils such that the transmit coil extends by a substantially same amount beyond each side of the receive coils. Otherwise the apparatus of FIGS. 10B and 10C is of the same form and function as described above.

Figure 11:
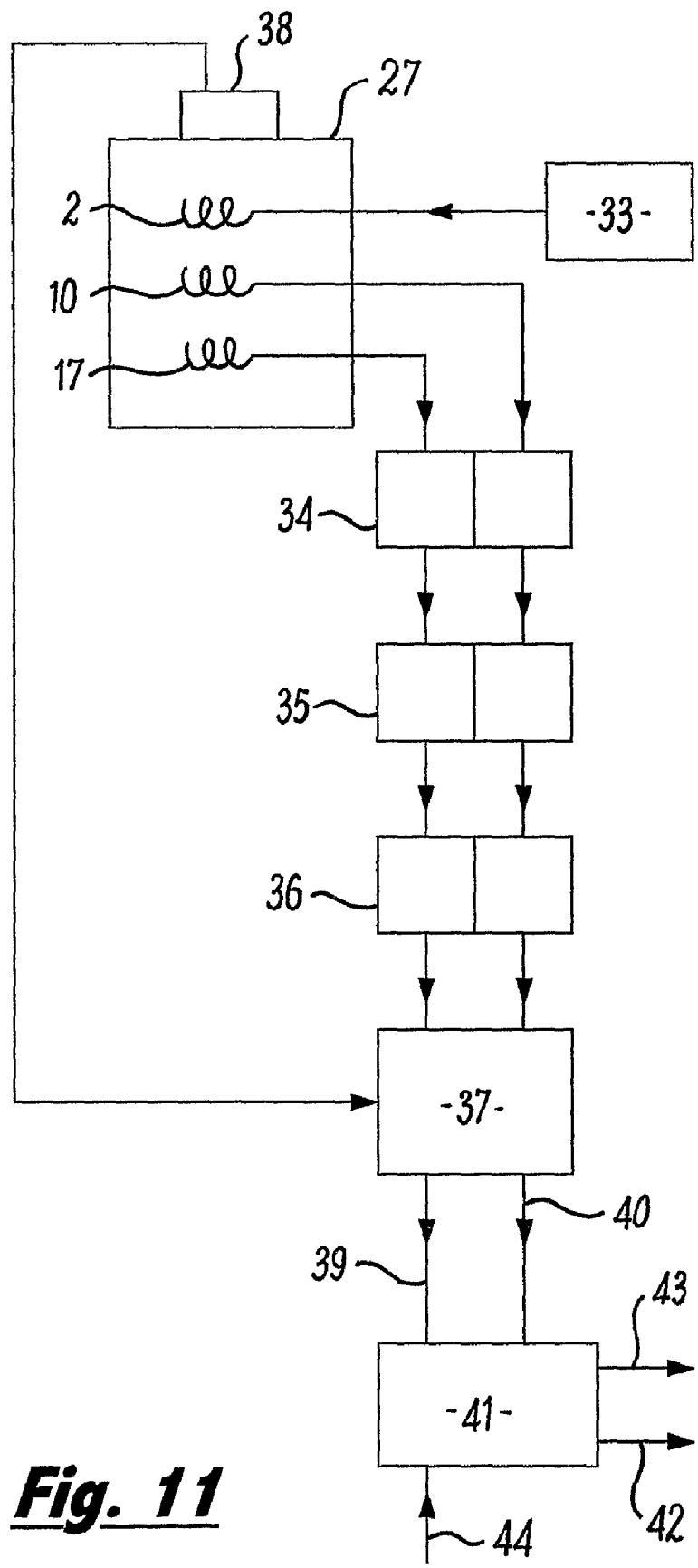
FIG. 11 shows a functional block diagram of apparatus according to the present invention.

FIG. 11 shows a functional block diagram for a complete pipe tracking system. This illustration incorporates the scanning version of the transducer 29.

The sine-wave generator 33 drives the transmit coil 2. The receive coils 10 and 17 feed into the chains formed by receiver filters 34, amplifiers 35 and A/D converters 36. These components may be designed by the skilled person with reference to nothing more than well known design techniques.

The Digital Signal Processing (DSP) functions 37 use methods well known to the person skilled in digital signal processing to further process the data samples together with the angle output derived from the shaft encoder 38 to produce target range and angle information 39 and 40.

Range and angle are passed to a computer 41 running a program to display ROV tracking information 42 and DOB 43. DOB is calculated from range and the height of the ROV above the seafloor, which is obtained from a separate sonar measurement 44.

In a scanning transducer having one transmit coil and two receive coils, the transducer of FIG. 9 and further described with reference to FIG. 10 is driven by a motor arrangement to oscillate plus and minus about an axis which lies at the intersection of the plane of the transmit coil and a plane parallel to the receive coils conveniently chosen to run through the approximate centre of mass of the transducer.

The transducer has the following properties. The former material is of plastics, for example Delrin. The coil impregnation is of epoxy resin. The one transmit coil is of size 0.2 m to 1.0 m and the number of turns is 50 to several 100 of enamelled copper wire. Two transmit sampling coils are wound over the transmit coil and are used to adjust cancellation. Each is of two turns that are centre-tapped. The three receive coils are of size 0.2 m to 1.0 m and the number of turns is 50 to several 100 of enamelled copper wire. The scanning motion is driven by a stepper motor.

The invention claimed is:

1. An apparatus for detecting a conductive object, the apparatus comprising:
   at least one transmitting device operative to generate a first changing magnetic flux; and
   at least one receiving device operative, in use of the apparatus, to receive a second changing magnetic flux generated by the conductive object in dependence upon receipt by the conductive object of the first changing magnetic flux,
   the at least one transmitting device and the at least one receiving device being disposed in relation to each other so as to attenuate the first changing magnetic flux received directly by the at least one receiving device from the at least one transmitting device,
   the at least one transmitting device and the at least one receiving device being mounted on the apparatus for rotation together, the at least one transmitting device and the at least one receiving device being operative to rotate in relation to the conductive object while the first changing magnetic flux is being generated and the second changing magnetic flux is being received, and
   the receiving device provides an output signal comprising at least one first frequency component corresponding to a rate of movement of the transmitting device and the receiving device in relation to the conductive object.

2. An apparatus according to claim 1, in which the apparatus is configured such that the output signal provided by the receiving device comprises at least one second frequency component corresponding to drift of the apparatus.

3. An apparatus according to claim 2, in which the at least one first frequency component is of a higher frequency than the at least one second frequency component.

4. An apparatus according to claim 2, in which the apparatus is configured to separate the at least one first frequency component and the at least one second frequency component from each other.

5. An apparatus according to claim 4, in which the apparatus is configured to electrically convey the at least one second frequency component to the receiving device to reduce the effect of drift.

6. An apparatus according to claim 1, in which the apparatus comprises two receiving devices spaced apart from each other.

7. An apparatus according to claim 6, in which the two receiving devices lie in respective, substantially parallel planes.

8. An apparatus according to claim 6, in which the apparatus is configured such that, in use, the two receiving devices are at different distances from a conductive object being detected.

9. An apparatus according to claim 1, in which the apparatus further comprises an electrical connection between the transmitting device and the receiving device, the apparatus being configured such that the electrical connection is operative to change magnetic flux coupled directly from the transmitting device to the receiving device.

10. An apparatus according to claim 9, in which the apparatus is configured to change at least one of an amplitude and a phase of an electrical signal conveyed by the electrical connection.

11. An apparatus according to claim 9, in which an electrical signal conveyed on the electrical connection corresponds to a signal driving the transmitting device.

12. An apparatus according to claim 9, in which the receiving device comprises a magnetic flux generating component that is operative to generate a magnetic flux in dependence on an electrical signal conveyed by the electrical connection, the receiving device further comprising an electrical coil and the magnetic flux generating component comprising at least one winding on the electrical coil.

13. An apparatus according to claim 9, in which the transmitting device comprises a magnetic flux receiving component that is operative to provide an electrical signal for conveyance by the electrical connection, the transmitting device further comprising an electrical coil and the magnetic flux receiving component comprising at least one winding on the electrical coil.

14. An apparatus according to claim 9, in which the apparatus comprises at least one of a magnetic flux transmitting component and a magnetic flux receiving component, the apparatus further comprising a transformer operative to drive the transmitting device, the transformer comprising a winding, which is operative to provide an electrical signal conveyed by the electrical connection.

15. An apparatus according to claim 1, in which the apparatus is configured such that a first integral of magnetic flux density over a predetermined area on a first side of one of the receiving and transmitting devices is substantially the same as a second integral of magnetic flux density over a predetermined area on a second, opposing side of the one of the receiving and transmitting devices.

16. An apparatus according to claim 1, in which the transmitting device lies in a first plane and the receiving device lies in a second plane, the transmitting device and the receiving device being disposed in relation to each other such that there is symmetry about one of the first and second planes.

17. A sub-sea conveyance comprising the apparatus according to claim 1.

18. A method of detecting a conductive object, comprising:
generating a first changing magnetic flux with at least one transmitting device;
receiving in at least one receiving device a second changing magnetic flux generated by the conductive object in dependence upon receipt by the conductive object of the first changing magnetic flux,
the at least one transmitting device and the at least one receiving device being disposed in relation to each other to attenuate the first changing magnetic flux received directly by the at least one receiving device from the at least one transmitting device,
the receiving device provides an output signal comprising at least one first frequency component corresponding to a rate of movement of the transmitting device and the receiving device in relation to the conductive object, and
rotating the at least one transmitting device and the at least one receiving device together on the apparatus and in relation to the conductive object while the first changing magnetic flux is being generated and the second changing magnetic flux is being received.

19. A method according to claim 18, in which the method comprises emitting the first changing magnetic flux through a conductive medium to the conductive object, the conductive object emitting the second changing magnetic flux to the receiving device through the conductive medium.

* * * * *